United States Patent [19]

Berger

[11] 4,308,655
[45] Jan. 5, 1982

[54] CASING FOR A MACHINE, WITH SEVERAL PARALLEL SCREWS, FOR TREATING MATERIALS

[75] Inventor: Pierre Berger, Saint-Etienne, France

[73] Assignee: Creusot-Loire, Paris, France

[21] Appl. No.: 84,655

[22] Filed: Oct. 15, 1979

[30] Foreign Application Priority Data

Oct. 16, 1978 [FR] France ............................ 78 29370

[51] Int. Cl.³ .......................................... B21D 39/02
[52] U.S. Cl. ...................................... 29/463; 29/445
[58] Field of Search ............... 29/463, 445; 74/606 R; 425/204; 366/85, 301

[56] References Cited

U.S. PATENT DOCUMENTS

| 2,550,226 | 4/1951 | Colombo ............................. 366/85 |
| 3,745,854 | 7/1973 | Haag et al. ....................... 74/606 R |

FOREIGN PATENT DOCUMENTS

| 1937547 | 2/1971 | Fed. Rep. of Germany ........ 366/85 |
| 2358362 | 5/1975 | Fed. Rep. of Germany ...... 425/204 |

Primary Examiner—James L. Jones, Jr.
Attorney, Agent, or Firm—Haseltine and Lake

[57] ABSTRACT

A casing for the n intermeshing screws of a treatment machine has an internal wall comprising n adjacent cylindrical sectors each subtending an angle A, having a radius r, and covering one screw over that part of the periphery which is outside the penetration zone of the screws. The casing is made from n shells, each of which has an internal face in the form of a cylindrical sector of radius r and subtending an angle B, which is less than A, and n guide bars, each of which possesses two concave faces forming a V and which are in the form of cylindrical sectors of radius r and subtending an angle $$C = \frac{A - B}{2},$$

and the axes of which are parallel and spaced apart by a distance e equal to the distance between the axes of the screws. Each shell is fixed to two guide bars in such a way that its axis coincides with the axes of the corresponding concave faces of the said guide bars.

2 Claims, 12 Drawing Figures

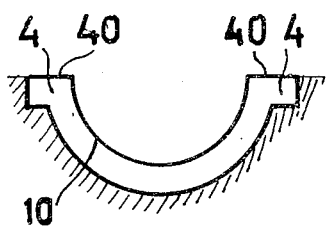
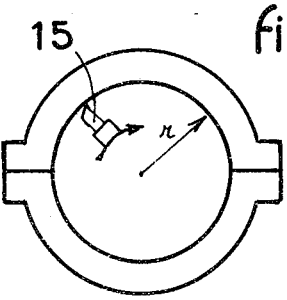
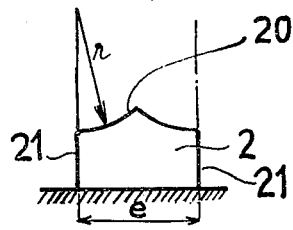
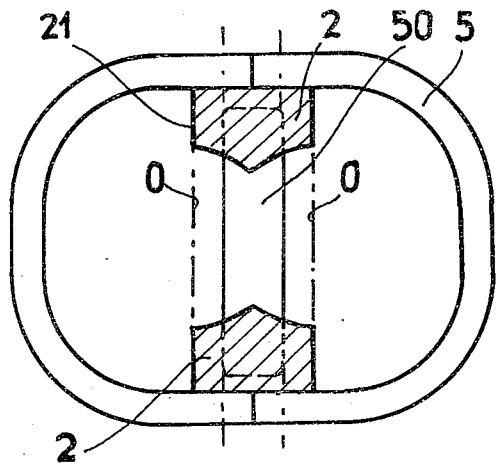
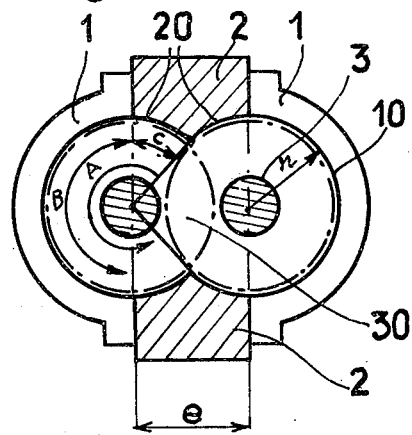
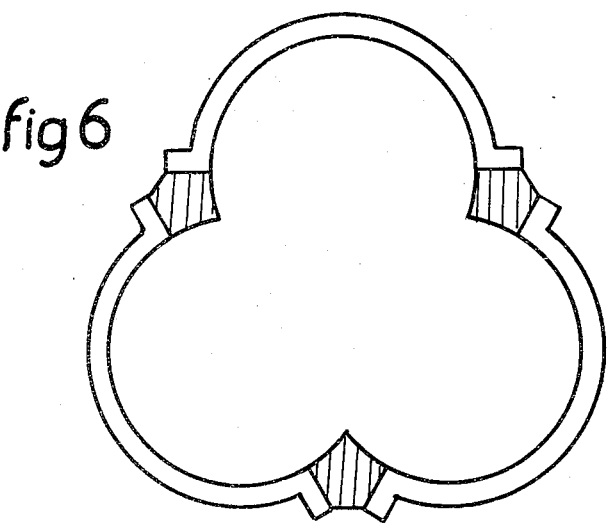

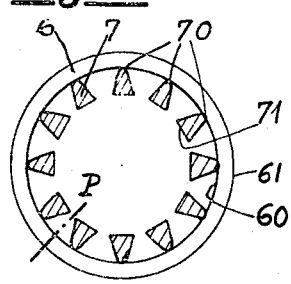
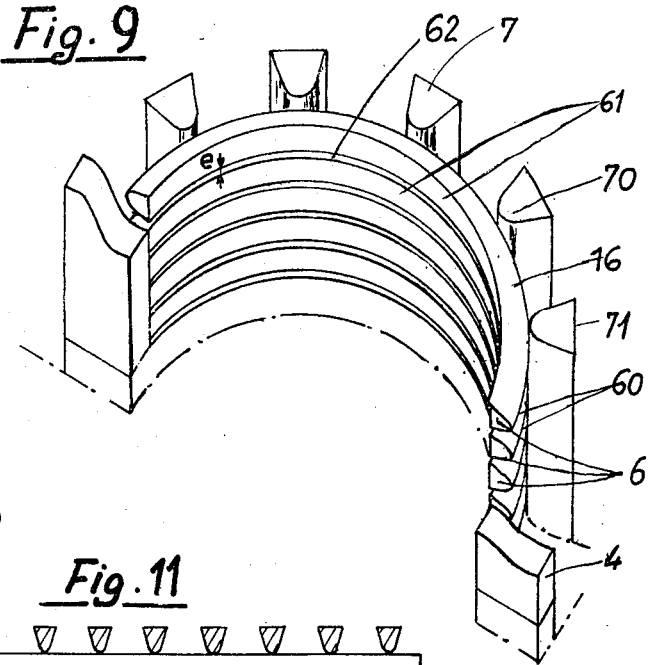
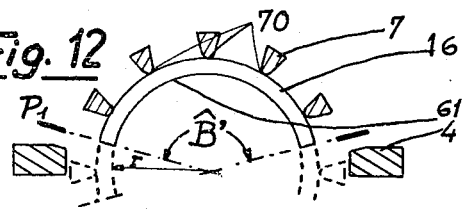
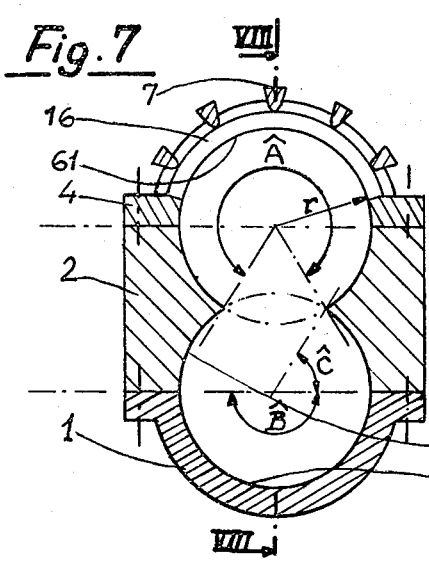
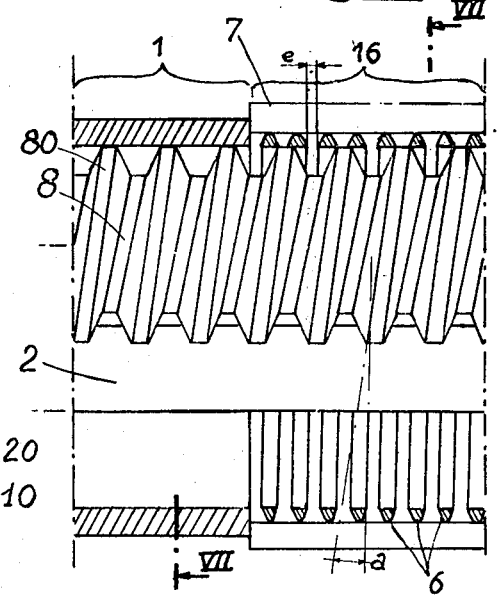

CASING FOR A MACHINE, WITH SEVERAL PARALLEL SCREWS, FOR TREATING MATERIALS

The invention relates to improvements in and relating to a casing for a machine, with several parallel screws, for treating materials.

Machines with several screws, in particular extruders, have been used for a long time, for example for the manufacture of plastics. These machines comprise several parallel screws having threads, the pitch of which can vary along the axis, and which penetrate into one another so as to carry the material along the threads by means of the rotation of the screws. For this purpose, the screws are placed inside a casing with several lobes, each lobe having a part-cylindrical internal wall covering one screw over that part of the periphery of the latter which is outside the zone of penetration of the threads.

In order to control the conditions of advance of the material in the screws, it is generally necessary for the clearance existing between the periphery of the screw and the internal wall of the casing to be as small as possible. It is for this reason that the internal walls of the casing must be bored with precision and, in machines comprising several screws, the construction of the casing in several lobes makes this operation difficult and expensive.

The invention relates to a new process which makes it possible, very simply and economically, to produce casings with several lobes for machines with several screws.

According to one aspect of the invention, there is provided a process for the production of a casing for n parallel screws of a treatment machine, which screws penetrate into one another and are caused to rotate inside said casing, the internal wall of said casing comprising n adjacent cylindrical sectors each subtending an angle A and having a radius r and each covering one said screw over that part of the periphery of said screw which is outside the zone of penetration of said screw, said process comprising:

producing n shells, each of which has an internal face in the form of a cylindrical sector having a radius r and subtending an angle B, said angle B being less than said angle A;

producing n guide bars, each of which has two concave faces forming a V, each said concave face being in the form of a cylindrical sector having a radius r and subtending an angle $$C = \frac{A - B}{2},$$

the axes of said concave faces being parallel and spaced apart by a distance equal to the distance between the axes of said screws;

connecting said guide bars to one another by means of joining members so that the axes of said concave faces coincide in pairs; and fixing each shell to two guide bars so that the axis of the internal face thereof coincides with the axes of the corresponding concave faces of said guide bars, and so that the unit consisting of a respective said shell and of two adjacent said guide bars forms a cylindrical sector subtending an angle A.

In a preferred embodiment of the invention, the internal face of each shell has the form of a cylindrical sector subtending an angle of $$\frac{2\pi}{n},$$

each shell being provided, along its rectilinear edges, with two flanges provided with joining faces extending in a plane passing through the axis thereof, and each guide bar is provided, on either side of said concave faces, with two parallel plane faces spaced apart by a distance equal to the distance between the axes of said screws, and wherein, before assembly with said bars, said shells are coupled along their joining faces so as to form a complete cylinder, said coupled shells are then simultaneously bored with a radius r, and after boring, said shells are separated and fixed to said separately bored guide bars, each said joining face of a said flange being fixed to a said plane face of a guide bar.

According to another aspect of the invention there is provided a casing for at least two parallel screws of a treatment machine, which screws penetrate into one another and are caused to rotate inside said casing, said casing having an internal wall consisting of several lobes each corresponding to a respective said screw, each lobe forming a cylindrical sector subtending an angle A, having a radius r and covering the corresponding said screw over that part of the periphery thereof which is outside the zone of penetration of said screw, said casing comprising a plurality of shells each corresponding to one said lobe, and a plurality of joining guide bars, each corresponding to a penetration zone of said screws and to which said shells are fixed, each shell having an internal face in the form of a cylindrical sector of radius r and subtending an angle B, which is less than A, and each joining guide bar having two internal faces forming a V, each of which is in the form of a cylindrical sector of radius r and subtending an angle $$C = \frac{A - B}{2},$$

the axes of said internal faces being parallel and spaced apart by a distance equal to the distance between the axes of the screws and coinciding with the axes of the said shells which are fixed on either side of the said guide bar.

Moreover, using a process according to the invention it is possible to produce a casing comprising one or more filtering zones. A cylindrical filtering sector of internal diameter r, having the desired length 1 and the desired angle at the center B', may be produced from a wall provided with orifices of the desired width. The filtering sector may be fixed to two elements which form flanges for fixing to the guide bars and so as to construct a filtering shell subtending an angle B.

In a preferred embodiment, each cylindrical filtering panel comprises a plurality of parallel hoops in the form of circular sectors fixed on their external surfaces to connecting bars which are parallel to the axis of the cylinder and are distributed over the periphery of said hoops, said hoops each having a cylindrical internal face of radius r, said internal faces being located in mutual extension to form said cylindrical internal surface of said panel, and having their lateral edges separated from one another by intervals which constitute said filtering orifices of said panel.

The invention will now be described with reference to embodiments thereof, given by way of example only, with reference to the accompanying drawings.

In the drawings:

FIGS. 1, 2, 3 and 4 show different successive stages of an embodiment of a process for the production of a casing according to the invention;

FIG. 5 schematically represents an embodiment of a casing produced according to the invention;

FIG. 6 shows a modified casing produced according to the invention;

FIG. 7 is a view in transverse section, along the line VII—VII in FIG. 8, through an embodiment of a casing with two lobes and comprising filtering parts produced according to the invention;

FIG. 8 is a partial view, in longitudinal section, along the line VIII—VIII of FIG. 7, of the casing of FIG. 7, inside which a single screw is shown;

FIG. 9 is a partial view in perspective of a filtering sector of a casing produced according to the invention; and FIGS. 10, 11 and 12 show, in transverse section, three stages of a method of producing a filtering sector for a casing according to the invention.

As shown in FIG. 5, for the case of a machine with two parallel screws, a casing embodying the invention comprises two shells 1 fixed to two guide bars 2. The Figure shows, in dot-and-dash lines, the two screws 3, which are caused to rotate to advance material inside the casing. It is known that the screws are driven in the same direction of rotation if their threads are identical and in the opposite direction if their threads are reversed. However, in all cases, the threads of the two screws penetrate into one another in a median zone 30 located between the two axes of the screws.

So that the material is carried along under good conditions in the machine, it is necessary for the two screws to be placed inside a casing, the internal profile of which covers the periphery of the screws with as small a clearance as possible, the tolerance depending in particular on the degree of viscosity of the material which it is desired to carry along in the screws. As a result, the internal wall 10 of the casing comprises two coupled cylindrical sectors; each of the sectors has an axis which coincides with that of one screw, and a radius r which is slightly greater than that of the screw but which must, however, be controlled with precision as a function of the permissible clearance. Moreover, each of the sectors subtends an angle A at the center, which depends on the distance e between the axes of the screws and on the radius of the latter.

Each shell 1 subtends an angle B smaller than angle A so that it covers only part of the periphery of the screw to be covered by the casing. The guide bars 2 cover the remaining parts of the screws adjacent the penetration zone of the screws, and each bar 2 is therefore composed of two concave faces 20 forming a V. Each concave face has an axis which coincides with that of the corresponding screw, and a radius r which is equal to that of the shell, and each has an angle at the center C, which is equal to $$\frac{A-B}{2},$$

so that the unit consisting of the shell and the two adjacent concave faces of the bars subtends an angle A at the center.

Such an arrangement makes it possible to produce a casing by a particularly economical process, the various stages of which are represented schematically by FIGS. 1 to 5.

In fact, the shells can easily be produced by boiler-making or molding techniques, as shown in FIG. 1. Furthermore, each shell is provided, along its rectilinear edges, with two flanges 4 on which there are provided joining faces 40 preferably located in planes passing through the axis of the cylindrical sector constituting the internal wall 10 of the shell.

In a preferred embodiment, the angle B is equal to 180°, with the result that the faces 40 are located in one and the same axial plane.

Consequently, after having accurately machined the joining faces 40, two shells 1 can be coupled to form a complete cylinder so that the two shells can be simultaneously bored with a radius r by means of a tool 15. (FIG. 2).

Two guide bars 2 have also to be produced. Each bar comprises two concave faces 20 (FIG. 3) forming a V, which have been bored with a radius r, and two joining faces 21 which have been accurately machined in such a way that they are parallel and spaced apart by a distance equal to the distance e between the axes of the screws, each face 21 thus being located in a plane which passes through the axis of the adjacent concave face 20 and is perpendicular to the plane passing through the axes of the screws.

As shown in FIG. 4, the two guide bars 2 are then positioned so as to cause the axes 12 of the concave faces located opposite one another to coincide. For this purpose, the two guide bars 2 are provisionally connected by means of joining members which, as shown in FIG. 4, can be hoops 5, which are at a sufficient distance from the guide bars to allow the positioning of the shells, or joining lugs 50, which are placed at the ends of the two guide bars.

With the guide bars precisely positioned in this way, it is possible to fix the joining faces 40 of the two shells to the faces 21 of the guide bars so as to obtain the complete casing shown in FIG. 5. The shells can be fixed to the guide bars 2 by any means, for example bolts which pass through the flanges 4 and engage in threaded orifices in the guide bars 2, or alternatively brace rods which pass through the guide bar and the two adjacent flanges and are provided at their ends with nuts bearing on the two flanges.

The embodiment which has now been described is particularly simple and can be used particularly when the machine is not subjected to an unduly high internal pressure. However, it is obvious that, in order to withstand a pressure, it suffices to provide sufficiently strong shells and an appropriate method of fixing.

It will also be noted that the above described process makes it possible to produce opening casings, which is advantageous in certain applications, as indicated, for example, in French Patent Application No. 78/05,495.

Furthermore, the shells can be produced by simple and economical processes such as molding or boiler-making processes or the mechanical assembly of simple elements. It is therefore easy to envisage the temperature conditioning of the shells, and if appropriate of the guide bars, by providing, inside the shells and, if appropriate, the bars recesses in which heat-transfer fluids can be circulated in order to heat or cool the casing, as required.

The invention has been described above with reference to a particular embodiment for two screws. It will be appreciated that it is equally applicable to other types of casing. Thus, for a casing for surrounding three screws, the same guide bars 2 can be provided with parallel joining faces which are spaced apart by a distance equal to the distance between the axes of the screws and are associated with shells each subtending an angle B at the center equal to 120°. For a casing for a machine with four screws, the same guide bars could be associated with shells each subtending an angle at the center of 90°.

However, if the shape of the guide bars is modified, it is also possible to use shells subtending an angle at the center of 180° for producing casings with more than two lobes. In fact, as shown in FIG. 6, it suffices for each guide bar to be provided with joining faces which form, with one another, the complement of the angle C subtended by the concave faces.

Thus, by means of different sets of guide bars, semi-cylindrical shells can be used to produce casings having the desired number of lobes.

Of course, a generalization could also be made and, if an advantage were to be gained thereby, other embodiments than those which have now been described could be used.

In particular, although it constitutes a certain advantage, it is not necessary to bore all the shells simultaneously and consequently to give the latter an angle at the center equal to $$\frac{2\pi}{n}.$$

Moreover, the boring operation may be superfluous if the method of producing the shells makes it possible to achieve sufficient precision, in particular as regards the internal radius r.

Furthermore, the shells can be constructed from cylindrical sectors which have been produced separately and are then fixed in any appropriate manner to elements forming the fixing flanges 4.

Such an embodiment can be adopted if the shell is to possess particular properties, for example of abrasion resistance.

However, this is also the case if the casing is to possess parts having a certain porosity, and the process which has been described is particularly applicable to the production of casings possessing filtering zones.

In fact, as shown in FIGS. 7 and 8, the process which has been described makes it possible to associate filtering shells 16 with the solid shells 1, the unit being held firmly together by means of the guide bars 2. A casing having filtering zones placed at chosen points, corresponding, for example, to certain zones of the screws rotating inside the casing, is thus obtained economically.

Moreover, it is possible to have a set of filtering shells having different porosities, and solid shells which, when associated with the filtering shells, make it possible to vary the length, and the angle subtended by the orifice size of the filtering zones.

The filtering shells can be produced to the desired dimensions, for example by sintering. However, it is also possible to form filtering sectors from tubes which have the desired porosity and can be manufactured in advance or can alternatively be obtained commercially.

Each filtering sector 16 is itself fixed, along its sides parallel to the axis, to elements for forming the flanges for fixing to the guide bars.

FIG. 9 shows a partial perspective view of a filtering shell produced in accordance with a particularly valuable original process, the main stages of which are illustrated by FIGS. 10, 11 and 12.

The shells are produced from a slotted tube, shown in transverse section in FIG. 10, which consists of a wire 6 wound in a helix around a plurality of small longitudinal bars 7 parallel to the axis of the helix. The wire 6 has a triangular cross-section so as to present, outwards, a cylindrical convex face 61, and it is wound with a sufficiently small pitch to form turns which are slightly spaced apart from one another by a gap 62 of width (e'). With the cylindrical faces 61 of the conjugate turns being located in extension of one another, the unit forms a cylindrical tube, along which there is a slot of width (e') wound in a helix.

The small longitudinal bars 7 also have a triangular cross-section and therefore each present, inwardly, a plane face 71, and towards the wire, an edge 70 on which the edge 60 of the helical wire bears, the two edges intersecting substantially at right-angles.

Thus, having first arranged the small bars radially around the axis, the wire 6 is wound in a helix around the whole, adopting a pitch which makes it possible to obtain a slot having the desired width (e'). The wire 6 and the small bars 7 are in contact by means of their edges 60 and 70 and can be held firmly together by means of welds at the points of contact.

Such slotted tubes can easily be manufactured, on request, to the desired dimensions or can even be obtained commercially.

To produce a filtering shell, a tube of this type is cut into sections through a plane P parallel to the axis of revolution (FIG. 10) and it is then laid flat (FIG. 11).

A kind of grid is thus obtained (FIG. 11), which can be rolled or stamped so that it possesses a concave internal face which has the desired radius (r) and consists of the faces 61 of the turns, the small bars 7 being located on the convex external face.

This tubular grid is then cut into sections along planes which are respectively parallel (Pl) and perpendicular to the axis of revolution, so as to form a sector 16 which has the desired length and subtends an angle B' at the center and is fixed to two elements 4.

Of course, the lateral faces 41 of the elements 4 are bored with the same radius r. A filtering shell is thus obtained which has the desired length and subtends the desired angle B at the center, the angle B' being determined as a function of the thickness of the elements 4, unless the filtering zone must not cover the entire opening of the sector, in which case the elements 4 provide the complement.

Moreover, it would be possible to envisage fixing the elements 4 to the edges 60 of the turns, the angle B' subtended by the filtering sector 16 then being equal to the angle B to be subtended by the shell.

As indicated above, the filtering shells thus obtained can be associated with guide bars 2, in order to form a casing with several lobes, by alternating filtering shells 6 with solid shells 1.

In addition, it can be of value, in certain applications, to progressively vary the porosity of the filtering zone. This result can easily be achieved as described above if, in manufacturing the slotted tube, the winding pitch of the turns of the wire, and consequently the width (e) of the slots, is varied continuously.

It may be noted that, by virtue of the construction of the above described filtering shells, a particularly effective scraping of the internal face of the casing can be achieved. In fact, as is apparent from FIG. 8 which shows one of the two screws 8 located inside the casing, these screws generally have a relatively small pitch; thus, the threads 80 form a fairly small angle (a) with the slots separating the turns 6. Consequently, at uniform intervals, the whole of each slot can be swept by a thread 80, and the solid particles which may have remained stuck between two successive hoops are either immediately taken up by the screw or pushed outwards, this expulsion being facilitated by the fact that the profile of the slot broadens towards the outside by virtue of the triangular cross-section of the turns. Thus, the filtering shell, which can thus always be thoroughly scraped, runs a lower risk of becoming clogged, and the materials deposited on the filter are immediately re-introduced into the advancing process inside the screws.

Of course, although the embodiment of the filtering shell which has been described is particularly suitable for use in the invention of this application, the latter is not restricted to this embodiment.

In fact, the filtering shells could be produced by conventional processes, either individually or from a tube having the desired internal diameter r, which is divided into sectors each subtending an angle B' at the center B' and having a length equal to that of the filtering zone to be produced. These sectors would then be fixed to elements forming the flanges, the thickness of which would be such that the whole subtended the desired angle B at the center.

In general terms, the invention is not intended to be restricted to the details of the embodiments which have been described, but covers all variants employing analogous or equivalent means.

What is claimed is:

1. A process for the production of a casing for n parallel screws of a treatment machine, which screws penetrate into one another and are caused to rotate inside said casing, the internal wall of said casing comprising n adjacent cylindrical sectors each subtending an angle A and having a radius r and each covering one said screw over that part of the periphery of said screw which is outside the zone of penetration of said screw, said process comprising:

producing n shells, each of which has an internal face in the form of a cylindrical sector having a radius r and subtending an angle B, said angle B being less than said angle A;

producing n guide bars, each of which has two concave faces forming a V, each said concave face being in the form of a cylindrical sector having a radius r and subtending an angle $$C = \frac{A - B}{2},$$

the axes of said concave faces being parallel and spaced apart by a distance equal to the distance between the axes of said screws;

connecting said guide bars to one another by means of joining members so that the axes of said concave faces coincide in pairs; and fixing each shell to two guide bars so that the axis of the internal face thereof coincides with the axes of the corresponding concave faces of said guide bars, and so that the unit consisting of a respective said shell and of two adjacent said guide bars forms a cylindrical sector subtending an angle A.

2. A process according to claim 1, wherein the internal face of each shell has the form of a cylindrical sector subtending an angle of $$\frac{2\pi}{n},$$

each shell being provided, along its rectilinear edges, with two flanges provided with joining faces extending in a plane passing through the axis of the shell.

* * * * *